(12) United States Patent
Zabtcioglu

(10) Patent No.: US 7,199,981 B2
(45) Date of Patent: Apr. 3, 2007

(54) HIGH RELIABILITY-PARALLEL DATA TRANSFER HARD DISK DRIVE

(76) Inventor: Fikret M. Zabtcioglu, 198-106th Ave. SE., Apt #8, Bellevue, WA (US) 98004

( * ) Notice: Subject to any disclaimer, the term of this patent is extended or adjusted under 35 U.S.C. 154(b) by 507 days.

(21) Appl. No.: 10/804,648

(22) Filed: Mar. 19, 2004

(65) Prior Publication Data

US 2005/0207067 A1 Sep. 22, 2005

(51) Int. Cl.
*G11B 5/55* (2006.01)

(52) U.S. Cl. .................................. 360/266.2
(58) Field of Classification Search ............ 360/266.2, 360/266.6, 267.6, 246.2, 971.01
See application file for complete search history.

(56) References Cited

U.S. PATENT DOCUMENTS

| | | | |
|---|---|---|---|
| 4,754,353 A | 6/1988 | Levy | 360/106 |
| 4,879,617 A | 11/1989 | Sampietro et al. | 360/106 |
| 4,949,201 A | 8/1990 | Abed | 360/78.07 |
| 4,954,904 A | 9/1990 | Goor | 360/75 |
| 5,343,347 A | 8/1994 | Gilovich | 360/106 |
| 5,675,452 A | 10/1997 | Nigam | 360/97.02 |
| 5,706,148 A | 1/1998 | Faris | 360/98.07 |
| 5,761,007 A | 6/1998 | Price et al. | 360/106 |
| 5,796,542 A | 8/1998 | Szeremeta | 360/77.02 |
| 5,836,205 A | 11/1998 | Meyer | 74/89.17 |
| 5,949,612 A | 9/1999 | Gudeman et al. | 360/97.01 |
| 6,005,747 A | 12/1999 | Gilovich | 360/98.07 |
| 6,252,743 B1 | 6/2001 | Bozorgi | 360/244.1 |
| 6,512,659 B1 | 1/2003 | Hawwa et al. | 360/294.6 |
| 6,532,137 B2 | 3/2003 | Huang et al. | 360/265.7 |
| 6,594,106 B1 | 7/2003 | Serrano et al. | 360/78.09 |
| 6,611,396 B1 | 8/2003 | Kermiche et al. | 360/77.04 |
| 6,611,401 B1 | 8/2003 | Burga et al. | 360/236.9 |
| 6,618,217 B2 | 9/2003 | Heaton et al. | 360/77.03 |
| 6,621,649 B1 | 9/2003 | Jiang et al. | 360/67 |
| 6,624,981 B1 | 9/2003 | Vigna | 360/294.3 |
| 6,633,457 B1 | 10/2003 | Lin et al. | 360/264.9 |
| 6,633,458 B2 | 10/2003 | Wu et al. | 360/294.4 |
| 6,655,002 B1 | 12/2003 | Maimone et al. | 29/596 |
| 6,661,593 B2 | 12/2003 | Ashikaga et al. | 360/51 |
| 6,674,598 B2 | 1/2004 | Smith | 360/69 |

*Primary Examiner*—Hoa T. Nguyen
*Assistant Examiner*—Mark Blouin
(74) *Attorney, Agent, or Firm*—Dean A. Craine

(57) ABSTRACT

A dual actuator arm assembly system that uses two pairs of actuator-carriage arms that linearly move over a stationary micro-rail independently. The geometric shape of the two pairs of actuator carriage arms conform to the arcs of the data tracks at an acute angle. System enables micro-actuation that is integrated to actuator arm and is a function of its geometry. Uninterrupted data stream and sector coverage and thus parallel data transfer scheme is made possible. Each actuator move only within a limited range of disk area, thus precision is increased, vibration is minimized and external transfer rate is speeded up and overall access time is shortened. Instant access to two quarters of the disk with two pairs of actuators and to park these without landing the heads—by positioning and constant fly height during idle mode, or when system is turned off, are introduced as what are new in the art.

20 Claims, 17 Drawing Sheets

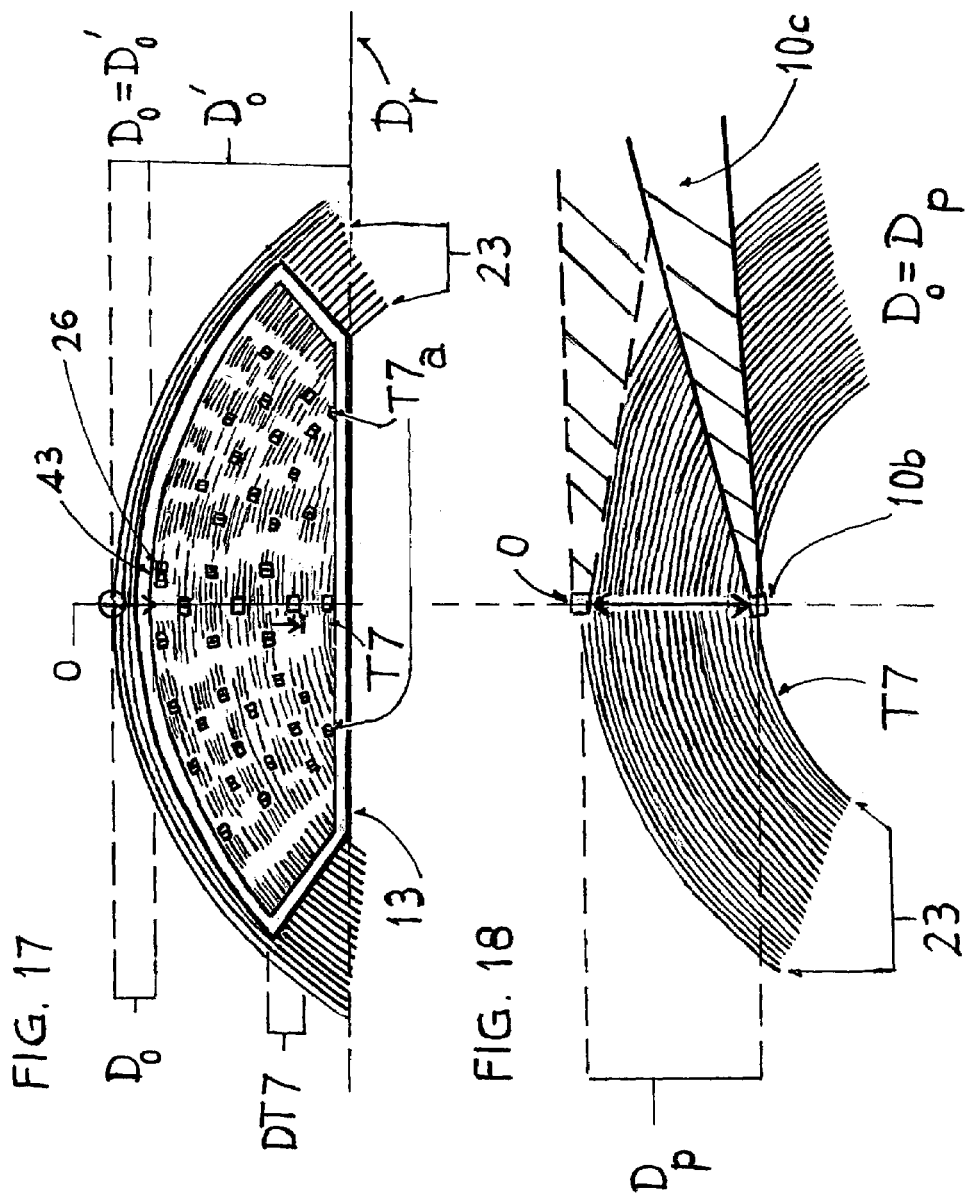

HIGH RELIABILITY-PARALLEL DATA TRANSFER HARD DISK DRIVE

BACKGROUND OF THE INVENTION

1. Field of the Invention

This present invention relates to magnetic disk storage systems, and more particularly, to a high reliability high performance hard disk drive systems having a unique structural organization, which includes special focus on isolating the disk area to four quadrants-based on the Cartesian system of coordinates- and read/write functions thereof with respect to timing. Out of which it has concurrent access to two quadrants and both sides of a disk in an instant in time. System has two pairs of actuator-carriage arms with multiple read/write head/disk interface regions, which regions offer greatly enhanced performance regardless of system size (i.e., media form factor). Continuous micro-pad contact and low fly height read and write and the use therefore of a low-mass, low fly height head/structure-suspension (both integrated as a single unit,) are key contributors at this interface regions. The invention can be used in any size rigid-disk system (size independence) that enables application of the invention for all small-media-form-factors as well. The number of platters can be increased to three or four or more.

2. Description of the Prior Art

Magnetic hard disk drives are used as the primary storage devices for a wide range of applications, including desktop, mobile and server systems. Demand for disk storage is increasing 60%–70% per year on a worldwide basis. In near future, consumer electronics and computer games and other media applications are very likely to form the basis for additional demand growth facing the disk drive industry.

A typical hard disk drive is made of a stack of closely spaced rigid disks, with actuator arms that carry very small magnetic transducer heads that move radially within the said stack of disks in a comb-like manner.

Since certain form factors have become standard in the industry, hard disk drive systems must be compatible to sizes of these form factors. Therefore, based on this constraint, increases in memory capacity of a hard disk drive of a given standard size are possible either by increasing the density of data written on a given area of a disk or by improving mechanical design. The trend has been towards smaller form factors.

The technologies involved in magnetic storage products generally are in one of the following categories: a) Technologies that pertain to the geometric formation of the heads for the contacting or non-contacting way of operation. b) Technologies that pertain to the design of the head/disk assembly that serves the operation of the read/recording heads, c) Technologies that pertain to the control and recording electronics, d) Technologies that pertain to the composition of the magnetic coating and lubricants.

Among the most important disk drive performance measurements are: a) Formatted box storage capacity, it measures storage capacity per unit of volume and has increasingly become more important as space is limited in desktops, and especially notebooks, laptops and other small portables; b) average access time to data, it is very important as it determines the time required to locate or store data and, c) data transfer rate, it is important as the disk drive data transfer rate influences overall system performance.

Reliability is the number one priority for users, number two priority is cost, but improved access time is also important-despite already improved fast seek times achieved. Therefore, different magnetic head positioning-actuator arms and drive arrangements have been designed to achieve such improvements, besides increasing the number of the disks.

Prior art magnetic positioning mechanisms-actuator arms developed are of two main type. Linear positioners are made of a carriage to carry actuator arms that are moved radially relative to the axis of the rotation of the disk to position the magnetic heads along multiple circumferentially positioned tracks. Pivotal actuator arms pivot on an axis parallel to the axis of the disks, thereby magnetic heads are carried at the ends of the arms and move in arcuate paths over the magnetic tracks of the disks. Current commercial hard disk systems employ mostly a conventional planar moving coil actuator assembly.

Prior art moving coil actuator assembly consists of an analog voice coil, a carriage arm, a suspension and head gimbal assembly member and a pivot member. The electromagnetic actuation force $F_A$ becomes effective at one end of the carriage arm in order to actuate the head positioning assembly. This results in a reaction force $F_P$ that is effective on the pivot member, since the force $F_A$ is a non-coupled force. The reaction force $F_P$ causes a vibrartion on the actuator assembly at about the pivot member, usually in a track seeking direction. This Quasi-Rigid body vibration mode is at mid band of about 4.about.6 Khz. Conventional planar moving coil actuator assembly usually has a track density of 6000.about.8000 TPI. The head positioning of these systems have a cross over frequency of 500.about.700 Hz, that can be sufficient for only 12000.about.14000 TPI. Whereas, the increasing trend of higher TPI makes fine-precision head positioning even more important and critical.

The current state of the art read/write heads operate at a distance of the order of 0.1–0.5 micron above the disk surface. This height—as per straight arm actuator and suspension system—being a microscopic distance; a range of 0.000004 to 0.00002 inch of fly height, has the potential danger of head crashes and loss of data when for example an unexpected impact-shock occurs to the desktop or to the notebook as the system is running—and this causes the head to ding as it is called in the field, to the hard disk surface, or sudden power failures result in head crash, or damage to heads or to surface. Nevertheless, it is desirable to have a fly height as close to the recording media as possible.

The low fly height and increased recording density can be understood from the following first equation tat expresses the dependence of the length of a pulse width PW50 obtained from a recording transition an the recording system.

$$PW50 = \{g2 + 4(d+a)(d+a+\delta)\}^{1/2} \quad (1)$$

where
g=gap length of the recording head
d=the distance separating the head and media
a=2Mr.delta./Hc (length of a recording transition)
.delta.=film thickness
Mr.delta.=magnetization-thickness product
Hc=coercivity This equation was provided by Williams and Comstock in "An Analytical Model of the Write Process in Digital Magnetic Recording, 17th Annual AIP Conference Proceedings, part 1, No. 5, 1971, pp. 738–742, American Institute of Physics.

Furthermore, disk tangential velocity is greater at outer tracks than at inner tracks that result in different wind speeds based upon where the slider is positioned. In rotary actuated drives, the slider changes skew angle from liner tracks to outer tracks. These differing wind speeds and differing skew angles cause variations in fly height.

Invention assumes zero disk slippage-therefore zero variation in track radius by runout and track distortion as a result of using high quality spindle and clamps.

Another problem with prior art hard disk drives is that at specific time intervals during normal operation of hard disk drive, a sequence called Servo Bank Write (SBW) is performed. At this time, write heads write position data to all of the servo wedges at the same time. In prior art hard disk drive systems, the sensitive read heads are subject to voltage variation in the SBW mode, where bias current can drop from $I_{biastotal}$ in the read mode to $I_{biastotal}/N$ in the SBW mode, that could result in read head damage. This problem is addressed by U.S. Pat. No. 6,594,101 entitled; Read Head Protection Circuit and Method, and can be implemented for the purposes of the present invention—it would be especially relevant, as a multiple number of read/write heads are employed in the present invention.

Furthermore, whenever the drive motor is turned on and off, the slider undergoes a sliding contact with a portion of the disk. This contact between the slider and the disk when the drive is turned on and off is known as contact start stop (CSS) operation. This CSS motion is a major cause that lowers reliability as the drive gets older and therefore reduces reliability in the long run. 20,000 CSS cycles for desk top and 100,000 CSS cycles for portable computer applications is considered proper. A higher number of CSS cycles is needed especially in systems where these are turned on and off frequently. A higher CSS number also means a longer product life expectancy and reliability.

Friction is related to two important problems: 1) Power consumption, 2) Head vibration. Lower power consumption is very important for battery-powered laptops, notebooks and portable systems. For these systems, power consumption due to interface should be a small fraction of 800 mW. With respect to friction sliding and stiction, these constraints are addressed by U.S. Pat. No. 5,949,612; entitled Low Friction Sliding Hard Disk Drive System, where the continuous sliding and the disk surface adhesion reduction texture that has a microscopic RMS roughness aspect that also reduces capillary adhesion, can be made compatible with minor adjustments and be applicable for the purposes of this invention. The friction must be minimized between the slider and the disk. Therefore, the solution of the invention to this problem is one continuous contact micro-pad per two thin film transducers.

Among various causes, the main cause of data loss is hard drive failures. The overall cause of data loss due to hard drive failures is a very high rate of 65%. For small and mid size companies, those that can not or have not made an investment in additional back up systems, data loss due to hard drive failures can mean great economic losses and may even result in business failures.

Among all hard drive failures, stiction accounts for about 60%. It is defined as the force it takes to get an object at rest on another object to start sliding. It is measured in grams to indicate the force required to separate the slider form the disk. The second type of stiction is called parking stiction and is a term used to indicate when the drive has not been in use and has been in the CSS zone. One reason of stiction is that some drives are lubricated with shellac or lacquer or other lubricants—when these get hot these liquefy. When drive is turned off, heads come to rest on the surface of CSS zone and the coating solidifies as the drive cools—and acts like a glue that keep the heads on the platter. Spindle failure accounts for about 15%, failed electronics on the drive account for about 20%.

The recovery services provided by data recovery companies for hard disk failures and to recover valuable data are very costly. Depending on the type of drive, it starts from $3,000 to $12,000 to recover data from a hard disk—if recoverable at all.

The straight-arm actuator system—which is a standard on most disk drives—is actually a system with inherently problematic structural and functional aspects.

First major problem is the limitation of the straight-arm actuator with respect to the disk area that it can cover simultaneously at any given instant in time. The straight-arm actuator can not cover different quarters of the disk concurrently at any given instant in time. Therefore, it must make many swinging motions-usually on one area arcuate trajectory to reach tracks that are located at many different concentric areas of the disk. Post boot up normal operational conditions, the single straight-arm actuator and similar variations of the same system have to make relatively long back and forth distance motions over the disk, as well.

Given the increased density of tracks, increased precision is needed. Despite the swift motions of the straight arm actuator, reaching the different tracks on the many different concentric areas of the disk is not instantaneous and requires many motions that involve sudden direction reversals of the straight-arm actuator that also have to be precise. The trajectory from the inner most tracks to the outer most tracks is a relatively long distance and as track densities increased, the precision demanded from the actuator system has been increasing substantially, since state of the art disks can have up to 20.000 tracks or more.

However, second, these motions of the straight-arm actuator and the associated read/write head assembly are subject to vibrations. Vibration has adverse effect on these small and sensitive components, including head vibration. Head vibration depends in part to mechanical resonance of slider—which generally increase with friction. Reduction of friction reduces both power consumption and head vibration.

Higher rpm is chosen as a way for fast access. However, this creates a third problem, high rpm has the problem of creating excess heat and is more demanding on the spindle motor. For example, state of the art 10,000 rpm drives reach a temperature of 100 F. and above during intensive use. Such a temperature is not tolerable in a cramped case without extra cooling. Additional cooling has both space and cost constraints. Furthermore, high rpm has more wear and tear-instability potential, especially in systems that are frequently turned on and off.

Fourth problem with any type of straight arm actuator system involves the constraint of having to park the R/W heads away from data tracks to a zone near the spindle, before the platter stops turning, because it depends on a microscopic distance of air cushion, that in turn depends on the turning of the disk that must not have any variation in the rpm during operation. When system is turned off or due to unexpected power failures for instance the constraint of having to park the heads come up. Parking the heads involves moving the read/write heads all the way to the parking zone—and to land heads, to a region that is located at the innermost reach of the head positioning system, each and every time the system is turned off. Then the heads must take off and then be moved back to data tracks when system is turned on.

Therefore, fifth, additionally because of microscopic fly height of the R/W heads, there is always the potential for damage to both R/W heads and damage to the substrate on the disk as the system is running—for example when the system is subject to external inadvertent shocks-bumps.

Sixth, these frequent motions also involve interruptions of reading or writing data streams. With a single straight-arm actuator, only serial data transfer scheme is possible. In serial data transfer scheme, the actuator first positions the R/W heads over a certain data track, then data is read or written with one head at a time then the data stream is interrupted as actuator moves heads to a different track. Due to frequent interruptions, the data transfer rate is much slower as compared to a parallel computing transfer scheme with continuous data stream.

These back and forth swings over a relatively long distance are erratic. This is especially true during the parking and boot up sequences, that are often repeated and hence in the long term, these sudden swings each time the system is started and turned off cause wear and tear. As a result, the system has lower reliability and lower product life expectancy.

Therefore, there is a need for an actuator mechanism that is: a) not subject to contact start stop (CSS) operation method and; b) not subject to Quasi-Rigid body vibrations and relatively high vibrations due to frequent direction reversals during the booting and parking, that is, there is need for an actuator system with lower-minimized vibration rates; c) based on concurrent access to more than one area of the disk surface at any given instant in time, by using more than one linear actuator and also because of a special geometric shape of the actuator-carriage arm that holds a plurality of R/W heads, it is able to read/write on multiple tracks, concurrently; d) not depended on high rpm that creates heat and/or is more demanding on spindle motor; e) Based on a constant R/W head low fly height that always remains at the same-constant fly-height-without the parking of R/W heads, with thin film R/W heads that have reduced interface surface; and f) based on an uninterrupted data transfer scheme—as in parallel data transfer scheme.

SUMMARY OF THE INVENTION

From the foregoing, it may be appreciated that a need has arisen for a method and apparatus for an actuator system and carriage arm that avoids the constraints of the prior art and is also more reliable.

In accordance with the present invention, the above shortcomings of the former hard disk drive actuator arm system, is effectively overcome by a double integrated actuator arm-suspension assembly that moves upon a stationary micro-rail. Transducer head read/write head (denoted R/W hereinafter) height is based on a continuous contact pad assisted constant fly height that has a unique parking method.

It is an objective of the invention to provide a system can be applied to all form factors, where it would be proportionally smaller and fit into a small formatted box storage capacity, such as form factor 2.5 inch or 1.8 inch, 1 inch or even special application smaller drives, so that same system can be applied on a variety of systems as notebooks and laptops, and for special purpose applications—such as in special vehicles as in air crafts, space crafts and the like—of very small form factors—since small form factor is correlated to better shook resistivity.

It is an object of the invention to have a multiple number of R/W heads feature that would be possible and compatible wit the high speed chips and processors.

It is an object of the invention to provide a system that has a logic that divides the total area of the disk to four quadrants with respect to an instant in time and the ability to have concurrent access to two quadrants at an instant. An instant in time is to be understood as a very short period in time between 1 ms to 5 ms. Thus it is based on an instant in time as correlated to the relative positions of the two pair of actuators and their concurrent access with respect to time.

The system consists of at least; a. one planer; b. Spindle, e. Dual actuator arm assembly that are made of two actuator arm members; d. at least one analog voice coil motor-magnetic movers, e. at least two stationary micro-rails that extend transversely over a platter from the perimeter edge to spindle external cover. f. Connection and moving members, g. Inner and outer actuator units; h. R/W heads.

It is an object of the present invention to provide a high reliability actuator arm assembly system that has the two stationary micro-rails feature, upon which the curved wing shaped pairs of actuators move—isolating area of disk in sectors and thereby reducing the total distance each actuator has to cover to a small fraction of what prior art straight arm actuator has to cover, therefore to eliminate the possibility of head ding and head crush failures that could be the result of stiction or other reasons, inclusive inadvertent external shocks.

Furthermore, actuator system can do the same main tasks by moving within a shorter distance with better precision and can complete tasks faster, such as boot up, formatting, scandisk, defragmention, compression, backup, maintenance and servo bank write, where these involve the constraint to reach the entire or most of the area of the disk. During normal drive operation, write/retrieve functions can be done fast and precisely. As a consequence, micro-actuator and associated wiring and other related micro-mechanic complications would not be involved.

It is an object of the invention to provide a HDD system that would not be adversely influenced by the unstable and vibrating conditions as within a mobile system as in an airplane or ground transportation vehicle.

It is an object of the present invention to provide a double, independently moving linear actuator and carriage arm and suspension system that enable the R/W functions to be made on two quadrants, and on both surfaces of a stack of disks simultaneously at any given instant. Each pair of wing shaped actuator and carriage arm components move on the linear micro-rail system, and can enable R/W functions to be carried out on multiple tracks and on both quadrants of the disk, with independent motions—moving upon the linear stationary micro-rails—and both sides of a stack of platters.

Due to the capability to reach different tracks at different concentric areas of the disk instantly and concurrently while each actuator has to move less frequently and within a considerably shorter range, system enables better precision.

Reduced optimal rpm is considered desirable to avoid heating problem that is associated with high rpm. High rpm is more demanding on spindle motor and since the time period-instant is much less than a second-few milliseconds-increased rpm is not relevant. Therefore, rpm greater than 5400 rpm is considered as high rpm. Above 7200 rpm is considered as very high rpm and excessive for the purposes of the present invention.

Therefore, it is further an object of the invention, in a first embodiment, to provide an optimal rpm of the disk that is compatible to said actuator system that can eliminate heating problem that occurs with high rpm drives. That is, to reduce the high rpm to an optimal lower rpm and thereby to eliminate both the heating problem of the high rpm of the prior art hard drives, as well as to reduce the power requirement and to reduce the stress on the spindle motor due to the higher rpm, that occurs especially because of stops and starts.

It is further an object of the present invention to provide an actuator-carriage arm system and associated R/W head assembly that minimizes or eliminates the vibrations on said actuator section and said associated R/W heads by minimizing the frequency of sudden back and forth direction reversals for reaching different tracks far apart.

It is further an object of the present invention to provide an integrated actuator-carriage arm system that can provide an uninterrupted data transfer scheme.

It is further an object of the present invention to provide an actuator-carriage arm and suspension system and associated R/W heads with a continuous micro-pad contact operation and constant low fly height—where two R/W transducers are each next to one continuous contact pad and have reduced size thin film transducers of non-physical contact type to reduce the dynamic friction substantially.

It is further an object of the invention to provide a wear-resistant coating that assists the continuous micro-pad contact that have minimized area of contact, thereby enables a multitude of R/W heads to be functional without causing wear on both the R/W heads and disk surface.

It is further an object of the invention to provide a hard disk drive that has a higher rate of reliability and a longer product life expectancy as a result of the sum of the above mentioned properties. As a result, the actuators of this invention enable faster seek-retrieve-write that also have better precision due to motions that take place within a considerably shorter range, i.e. integrated micro-actuation function.

In the preferred embodiment, the independent double linear micro-rail actuator system is made of two independent stationary micro-rails that are stationary over two different quadrants of the disk, on which four wing shaped actuators-carriage arms in total move linearly. Each curved wing shaped actuator-carriage arm, hereinafter called actuators have multiple R/W heads that are in a series of curvilinear formation that conform to the curves of the tracks of the disk. Conforming to the curves of the tracks is to be understood that the plurality of R/W heads are in such a series and affixed under said actuator in such precise angles, that the R/W heads conform geometrically to the curves of at least several adjacent tracks simultaneously, without having to make additional actuator positioning adjustments most of the time or with only very minor distance adjustments. (See FIG. 17.) The geometry of the actuator and the multiple R/W heads conform to the track curves-arcs, so that they are positioned over the tracks exactly in a curvilinear configuration, instead of a head actuation system of the prior art—where fewer number of R/W heads have to constantly swing over and has to be re-positioned tangentially over longer distances. Hence, even as the actuators are not moved and remain over a certain arc-like area, a multitude of data tracks can be read and written upon at that instant and many complete sectors in a row can be read without interrupting the data stream, since the R/W heads do not have to be repositioned very frequently—as these have to be in the prior art.

Based on this system, it is possible to position the two pairs of wing shaped actuators-carriage arms in such a relative position at an asymmetrical position that, even when positioned asymmetrically, the concentric area of disk is divided to four. (i.e. inner concentric and outer concentric tracks times two.) When positioned symmetrically (see FIG. 6,) over same concentric tracks that pass through both quarters and below both actuators and heads, this results in a division of the total concentric area also to four, but in addition it enables very fast-instant access, even as the wing shaped actuators-carriage arms do not change position and remain stationary at that instant.

It is further an objective of the invention to provide a low constant, non-variable fly height, that eliminates problems associated with R/W heads parking requirement that involves landing the heads to a surface-zone near the spindle of the prior art, and also eliminates fly height variation that occurs as a result of depending on the thin air layer that lifts the transducer in the prior art. Also eliminated is operation head-substrate wear and tear in the long run. In order to have even higher accuracy under the low fly height, the transducer heads gap width is of reduced type. Since each actuator area of motion-coverage is limited—reduced fly height becomes possible—with less friction—as each actuator moves only within a designated shorter-limited distance of the radius of the disk, (i.e. linearly within each ½ of the radius.) Low fly height allows high coercivity media that in turn enables a narrower transition length "a".

It is further an objective of the present invention to provide a second embodiment with higher spindle speed-rpm, a very fast data access time and to considerably increase the external data transfer rate.

It is further an objective of the invention to provide a third embodiment of the system, where the Blue tooth technology would be applied within—a localized micro range—within the drive between transducer heads and drive electronics control board and thereby the need to connect flexible printed circuit (FPC) board electronics wiring between the heads-actuator-carriage arms and drive electronics control board units would be eliminated.

These and other objects of the present invention will be more evident as depicted by the drawings.

DESCRIPTION OF THE DRAWINGS

FIG. 9A is a side elevational view of a prior art transducer head with a wider head gap width as compared to the narrow head gap width of the invention-FIG. 9a.

FIG. 17 is a partial plan view of the multiple R/W heads with the cover plate of actuator arm completely removed and their positions that conform to a series data tracks by forming a set of arc angled R/W heads.

FIG. 18 is a partial top view of the prior art actuator arm R/W head movements angle and distance relationships with respect to a given set of data tracks.

DESCRIPTION OF THE PREFERRED EMBODIMENT

The system of this invention can be described by the following formula:

The 1 ms to 5 ms it takes for the concurrent full stroke access to a set of uninterrupted data tracks and sectors on two quadrants of disk area=(in every ¼ Π radians per one revolution of disk)×2 (on two quadrants)×4(by two pairs)×2 (on both sides of the number of units of platters.)    (2)

Figure 1:
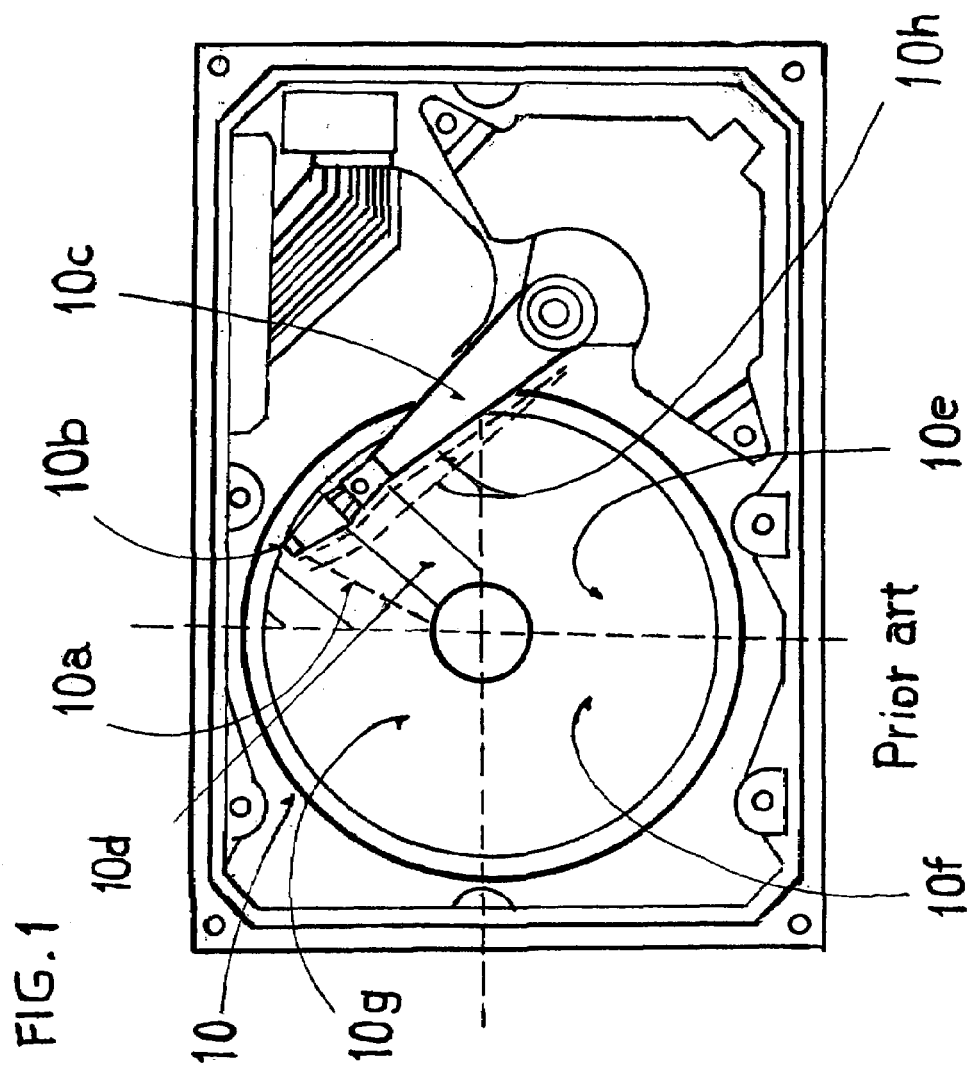
FIG. 1 is a top view of a prior art hard drive that uses a straight-arm actuator arm.

With reference to FIG. 1, the prior art has a rotating disk 10 and carriage arm 10c, where the transducer head 10b moves along a path 10a. At tat instant the transducer head 10b can only access tracks that are on quarter 10d. Tracks on quadrant areas 10e, 10f and 10g are not accessible by the straight-arm actuator 10c at that instant in time. For example for any track on quarter area 10g to be accessible by transducer head 10b, the disk 10 must make many more revolutions than one single revolution or less than one revolution and even then the carriage arm 10c has to make many swinging motions on the path 10a until the desired track becomes accessible. The back and forth motions-direction reversals also involve vibrations as is indicated by 10h.

Figure 2:
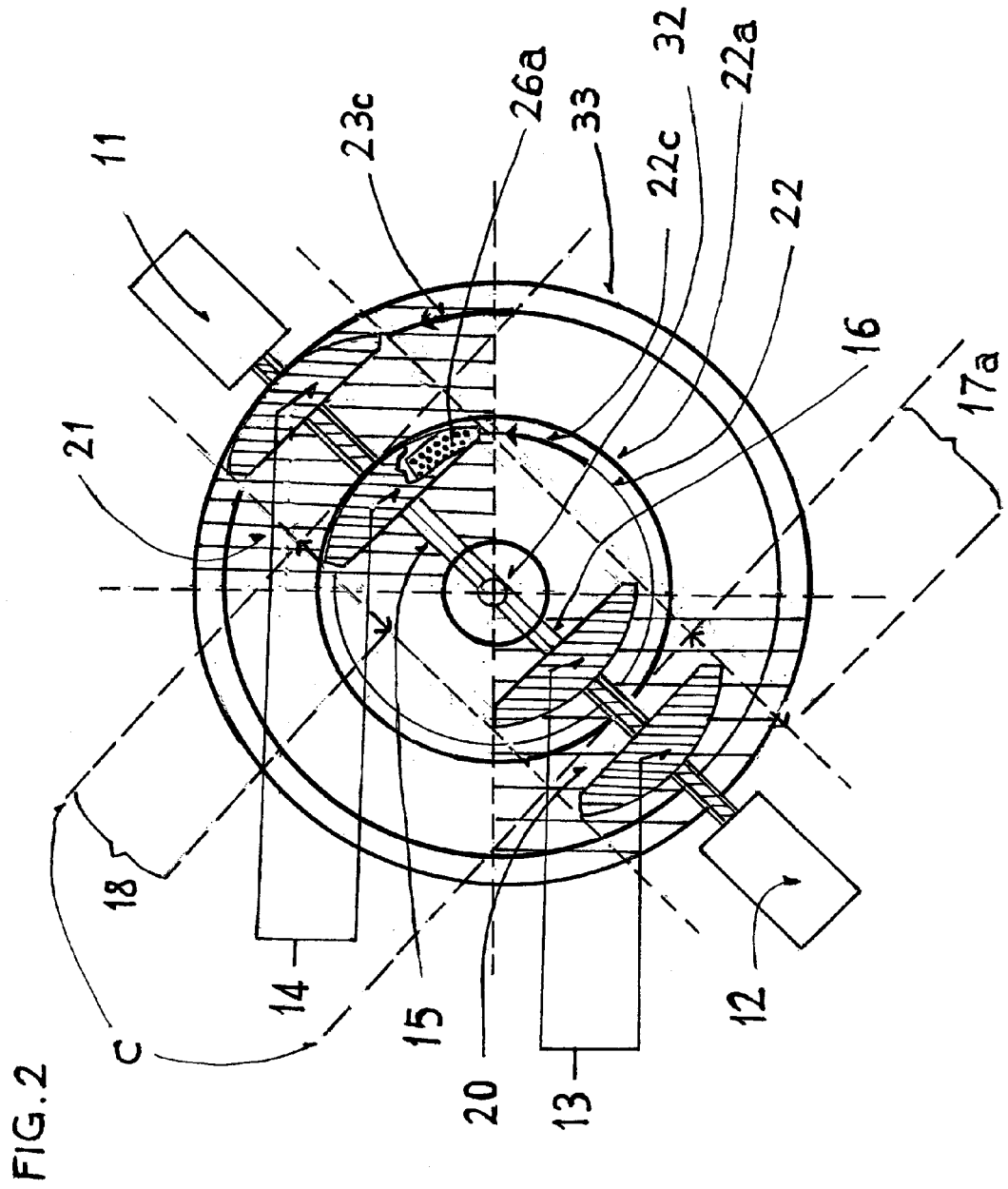
FIG. 2 shows is a top plan view of the double independent linear micro rail actuator-carriage arm and suspension system that is able to have two different circumferential areas concurrent positioning based on dividing the total disk area into two areas of inner most tracks and the outer most tracks. Also depicted are the two pairs of wing shaped actuators-carriage arm geometry that forms multiple R/W heads to be compatible to said geometry, that generally conform to the curves of the tracks.
Figure 14:
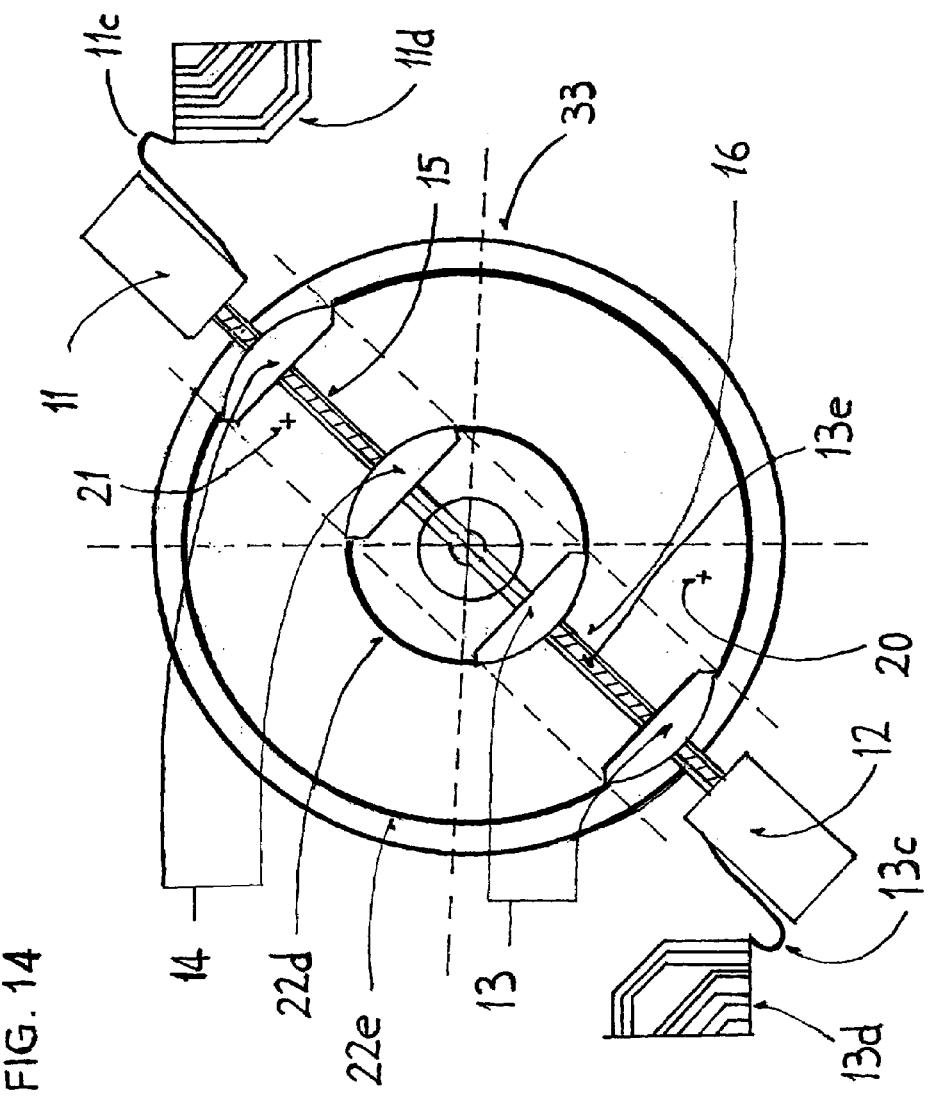
FIG. 14 is a top view of the actuator-carriage arm that shows how the heads are at parked position on the concentrically aligned non-data zones.

With reference to FIG. 2, the wing shaped dual actuation arm assembly 13 and 14 are able to reach concurrently two different quadrants 20 and 21 respectively of the disk 33. The reference center line C divides the half of disk 33 area further into two equal halves to indicate the limit that one or the pair member that reaches the inner reach border of actuator 13, that is, it shows the inner limit of the distance 17a that one of the pair member of wing shaped actuation-carriage arm 13 moves within the ½ quarter area, ½ of the radius of disk 33. Similarly the inner actuator member 14 moves within limited distance 18. Wing shaped dual actuation arm assembly structure 13 is moved by a linear analog voice coil motor 12 and wing shaped dual actuation assembly structure 14 is moved by a second linear analog voice coil motor 11 linearly, by moving the connection and mover member 13e (see FIG. 7). When the wing shaped actuators arms 13 and 14 are positioned on different circumferential areas, a set of adjacent multiple number of tracks 22 and 23 become accessible for R/W functions. The multiple number of tracks 22 and 23 can reach R/W beads 26a with only less than one revolution of the disk 33. Furthermore, since the wing shaped geometry of actuators-carriage arms 13 and 14 each have a length that extends as an arc like shape along the concentric tracks of the disk 33 and conform to the track curvatures-arcs 22 and 23, not only a multitude of tracks 22 and 23 are reached concurrently, but also many complete sectors in a row 22c and 23c pass under the continuous-uninterrupted reach of the R/W heads 26a for a longer times. Therefore, many complete sectors can be identified instantly—instead of sequentially—as in the serial data transfer scheme. Sector interleaves and head skew would become more effective and efficient. A very fast input-output bus and large buffer in RAM would be needed for this system. Track 22a is the outer most border between inner most tracks and the outer tracks—that divides ½ of the radius of the disk to two halves, upon which actuators 13 and 14 move. Border tracks 22a of FIG. 2 and the inner non-data zone 22d of FIG. 14 are located adjacent to each other. Those skilled in the art will recognize that the complete hard disk sectors 22c and 23c depicted are not drawn to scale in FIG. 2, but are rather depicted as much thicker lines for visual clarity.

Referring to FIG. 2—upper right quadrant 21, the cutaway view of the multiple R/W heads 26a shows how the R/W heads 26a are in a series below the wings of the wing shaped dual actuator-carriage arm 14, and face the disk surface 33a. The disks 33 and 34 are turned by a spindle motor 32.

Figure 3:
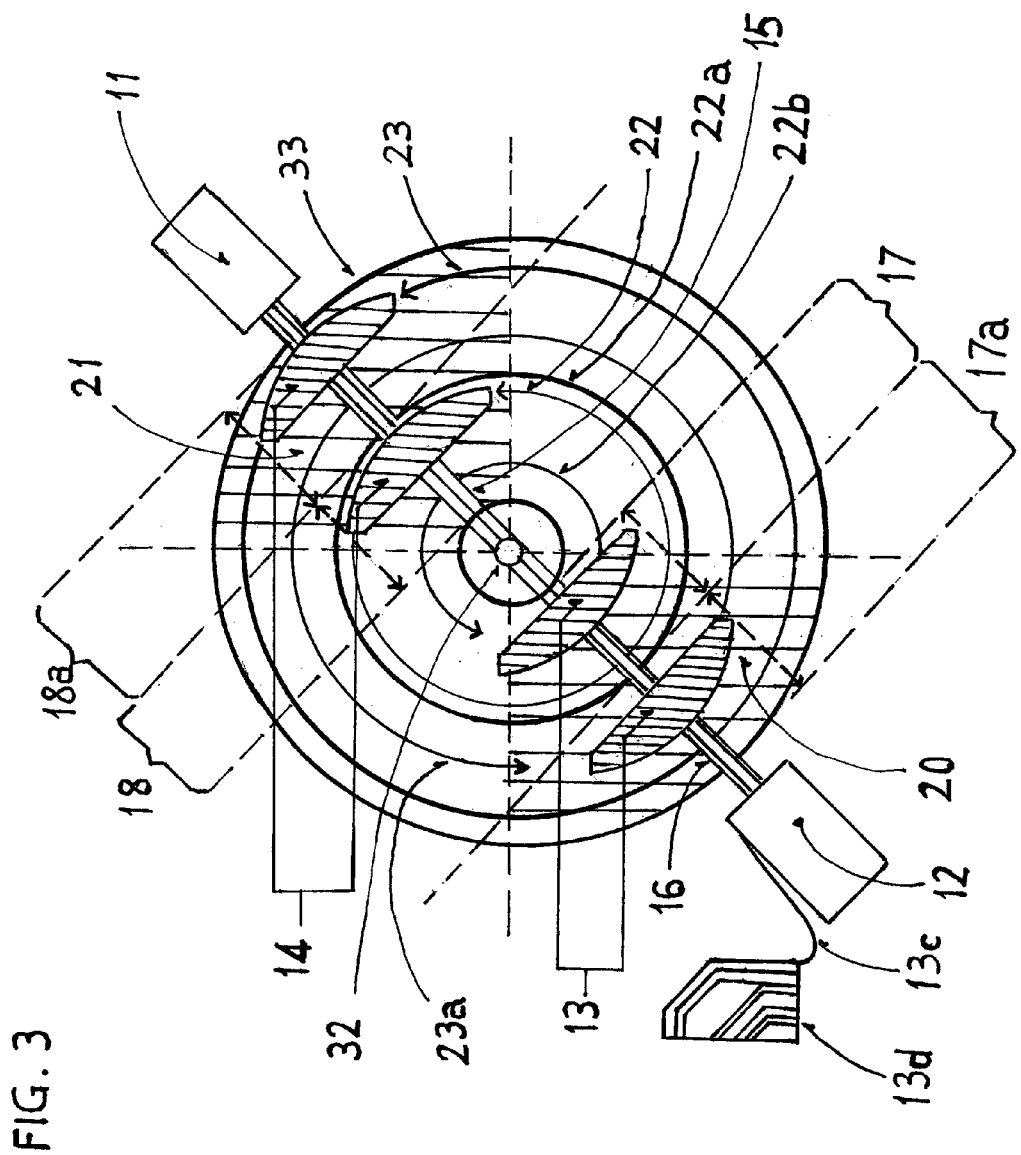
FIG. 3 is a top plan view, of the actuator-carriage arm system that has concurrent access by wing shaped actuators to two main quarters that results in accessing four different concentric areas of tracks concurrently. Also depicted is one of the flexible printed circuit (FPC) board that has the wiring board connection which has signal lines that connect magnetic heads to the drive electronics board.

With reference to FIG. 3, the two pairs of wing shaped actuator-carriage arms and suspensions 13 and 14 cover two quadrants 20 and 21 of the disk 33 area concurrently and can move independently. Data track 23a is one set of innermost tracks of the outer most set of tracks, that are located on the outer ½ area of the disk 33. Similarly data track 22b is one set of the inner most tracks that are within the inner ½ area of disk 33. The limited designated distances 17 and 17a are assigned to each actuator members of the pair actuator 13.

Similarly, the actuator pairs 14 move within the designated limited distances of 18 and 18*a*. The opposite quadrants 20 and 21 that the pair of actuators 13 and 14 function upon, are the areas over which the system has concurrent R/W capability. Pair actuator arms and suspension 13 moves on linear stationary micro-rail 16. Similarly, the pair of actuator arm and suspension 14 moves on linear stationary micro-rail 15. Also shown is one the flexible printed circuit (FPC) electronic wiring 13*c* and 13*d* connection that connects wiring 13*a* to the drive electronics board.

Figure 4:
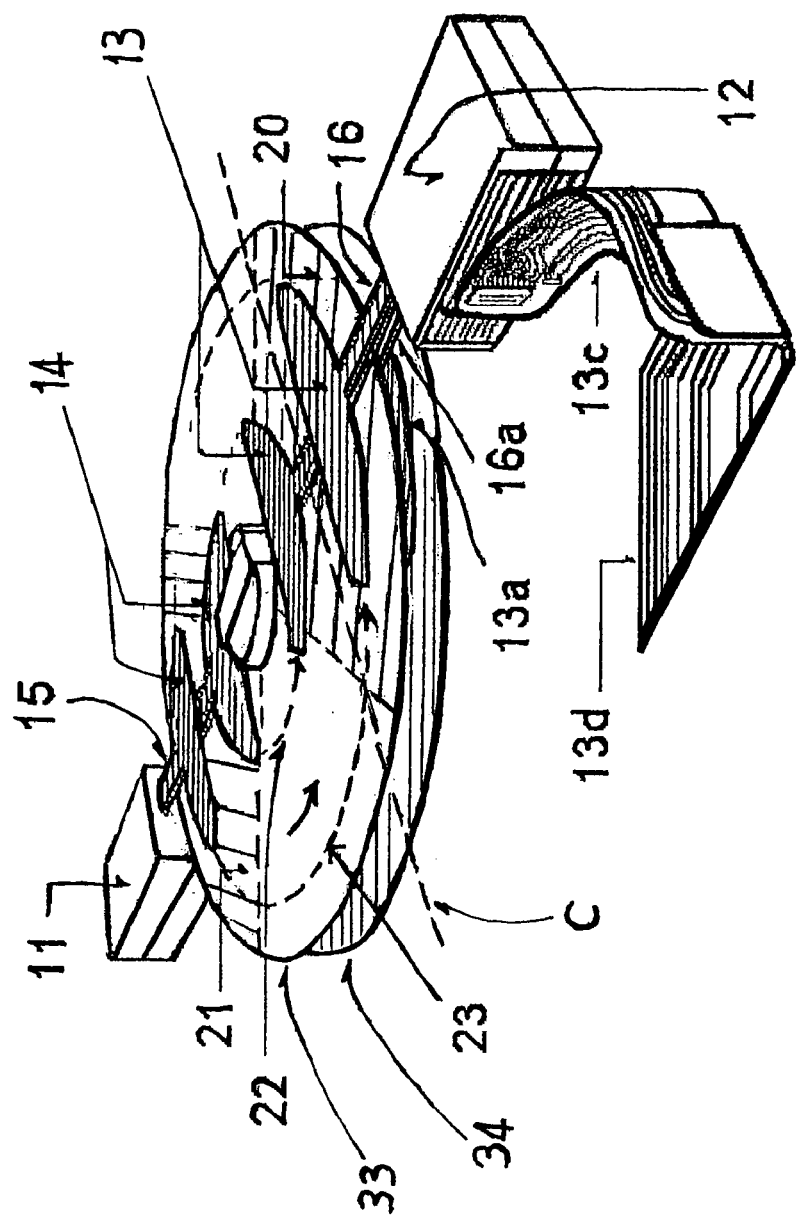
FIG. 4 is a perspective view, showing the concurrent two quarters actuator-carriage arm and suspension system with the wing shaped arcuate arms. Also depicted is the flexible printed circuit (FPC) board electronic wiring connection that connects the actuator and R/W heads to the drive electronics board.

With reference to FIG. 4, depicted in perspective view are both pairs of wing shaped actuators-carriage arms 13 and 14 that move upon the stationary micro-rails 16 and 15 respectively. This pair of actuator arms 13 enables access to two different quadrant areas 20 and 23 of the disks 33 and 34 concurrently. Due to the pair of actuators 13 and 14, a multitude number of inner tracks 22 and a multitude number of outer tracks 23 are read/written concurrently with only ½ of a revolution of the disk 33 and 34. The flexible printed circuit (FPC) electronic wiring board 13*c* and 13*d* that have a wiring pattern that have signal lines that connect the wing shaped actuator-carriage arms 13 and the actuator pair below for the second platter 34, 13*a* and R/W heads 26, 27, 28, 26*a*, 27*a*, 28*a* (all not shown) to the drive electronics board. The identical and parallel reference center lines C indicate the inner limit of the outer actuator 13—one member of the pairs of actuator 13 that is over the outer ½ tracks—of the disk 33, this is the inner limit reaching border for the outer one of the actuator 13. Same applies for actuator arm assembly pair 14.

Figure 5:
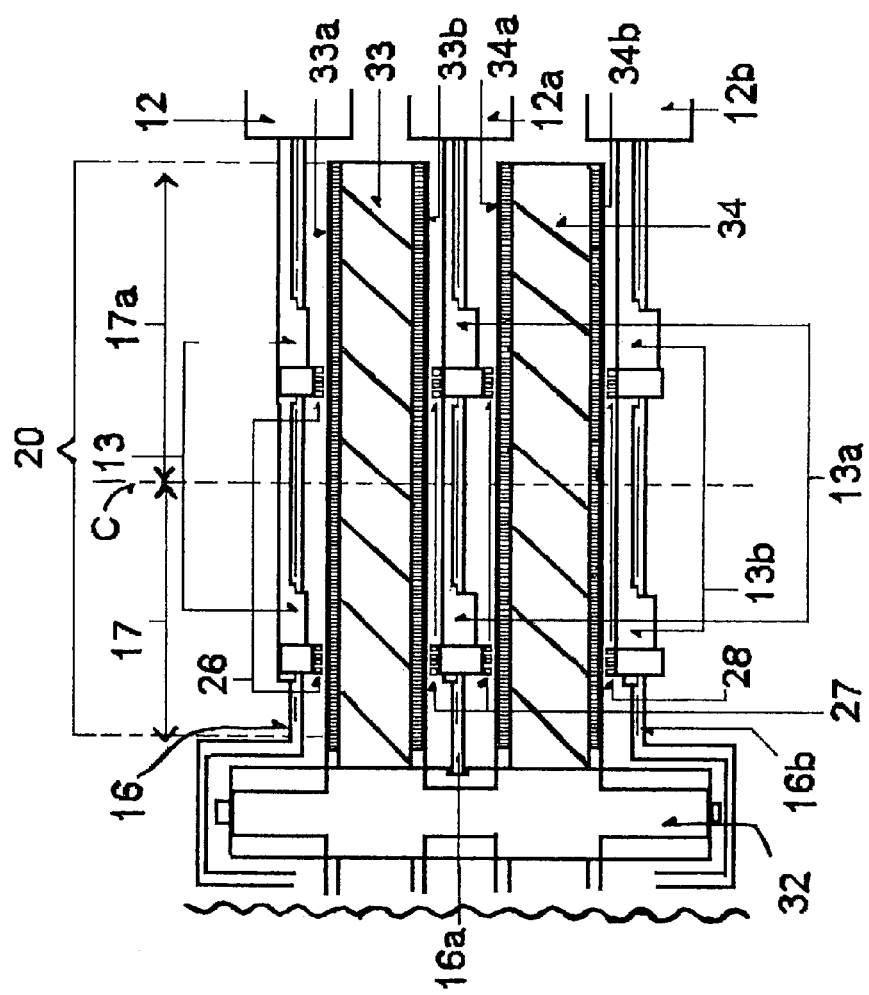
FIG. 5 is side elevational view of one-half of the disk area showing how the R/W heads are positioned and move linearly on the micro-rails.

With reference to FIG. 5, depicted is a partial ½ side elevational view of the disk of the two platters 33 and 34 and the R/W heads 26, 27, 28 and their single continuous contact pad system (not shown in this drawing) per each one R/W head 26–43, 27–43, 28–43, that move linearly on the stationary micro-rails 16 and 16*a* and 16*b*, by analog voice coil actuator motors 12, 12*a* and 12*b*, that also have a digital mode-which enables a fast skip function of data tracks 22, 22*a*, 23 (please see FIG. 2). The half of the disks of 33 and 34 are further divided into two identical and parallel to each other reference center-lines C to be indicative of the limits of the distance that one of the outer of the pair of the actuator-carriage arm system moves. These R/W heads 26, 27, 28 are able to read/write on disks 33 and 34 surfaces 33*a*, 33*b* and 34*a* and 34*b* concurrently. The spindle motor 32 of the double platter system is seen at left. The stationary micro-rails 16, 16*a* and 16*b* cover one of the quadrant areas 20, of the two disks 33, 34 with both surfaces 33*a*, 33*b* and 34*a* and 34*b* being read and written upon. Note, not shown are the same components that are at the other half-quarter of the disk 33, (left side of FIG. 5,) for actuator-carriage arm 14 and R/W heads 26*a*, 27*a* and 28*a* and their single continuous contacts pads 43. The micro-rail 15 covers the other half area of the disk 33.

Figure 6:
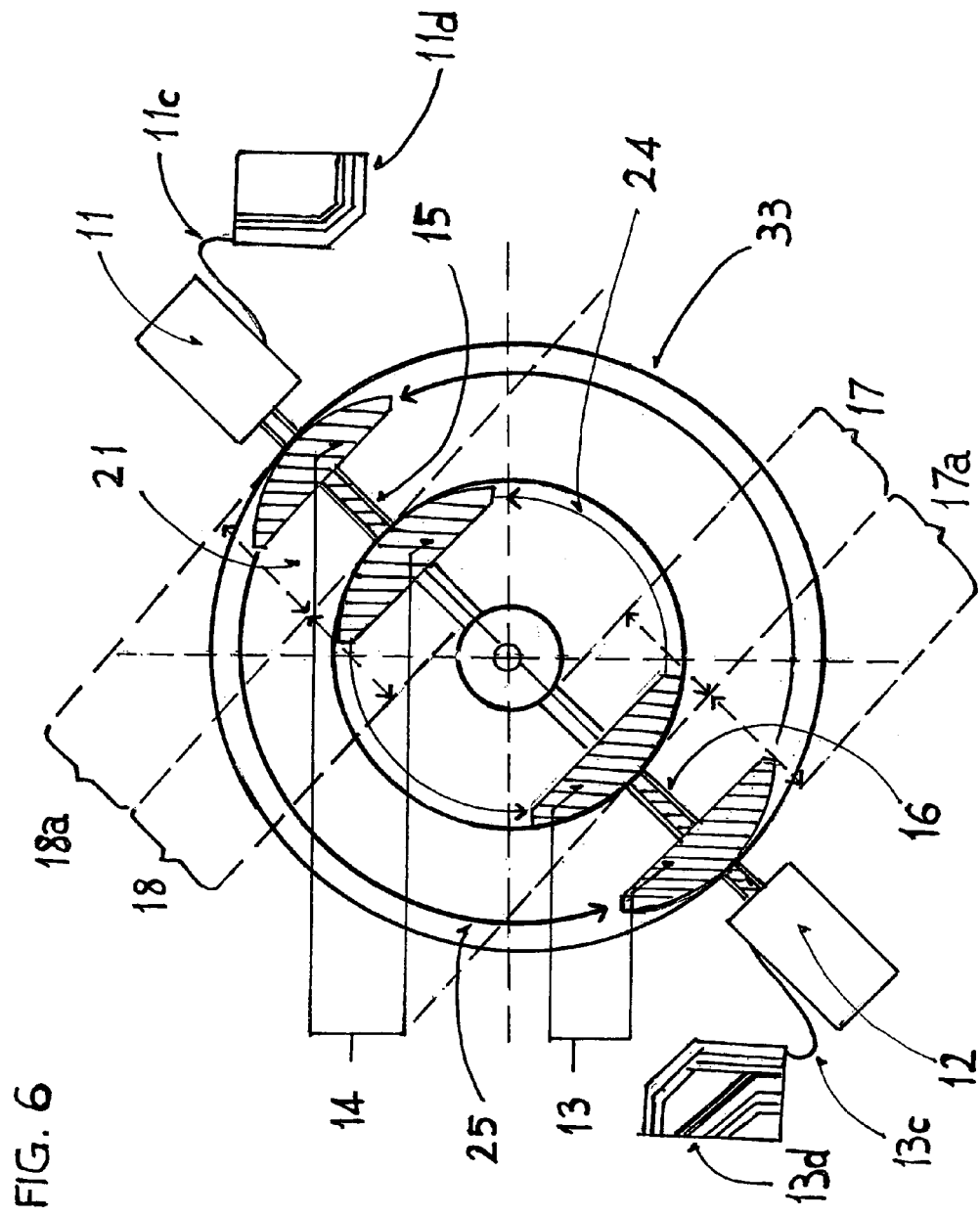
FIG. 6 is a top plan view of the two pairs of wing shaped actuator-carriage arm system and how this results placing a set of tracks 24, 25 under R/W heads 26 by only a ½ tour of a complete revolution of the platter—for both pairs. Also depicted are the flexible printed circuits (FPC) board electronics wiring connection to said wing shaped actuators that connect actuator and R/W heads to the drive electronics board.

With reference to FIG. 6, the wing shaped actuation-carriage arms 13 and 14 are able to reach concurrently two different quadrants 20 and 21 of the disk area, when these are in a symmetrical positioning—as depicted. When the wing shaped actuators 13 and 14 are positioned symmetrically on the same opposite concentric areas, a set of multiple tracks 24 and 25 becomes accessible, this multiple number of tracks 24 and 25 reach R/W heads with only ½ of a revolution. The flexible printed circuit (FPC) board 13*c* and 13*d* and 14*c* and 14*d* electronics wiring-signal connection to said wing shaped actuators 13 and 14 that connect actuator and R/W heads 26, 27, 28 of actuator pair 13, and 26*a*, 27*a*, 28*a* of actuator pair 14 (not shown—see drawings 2,5,7) respectively to the drive electronics board. R/W heads 26 through 28*a* are not shown in this drawing, R/W heads 26*a* through 28*a* are the counter part R/W heads of actuator-carriage arm 14 that is for quadrant 21.

Figure 7:
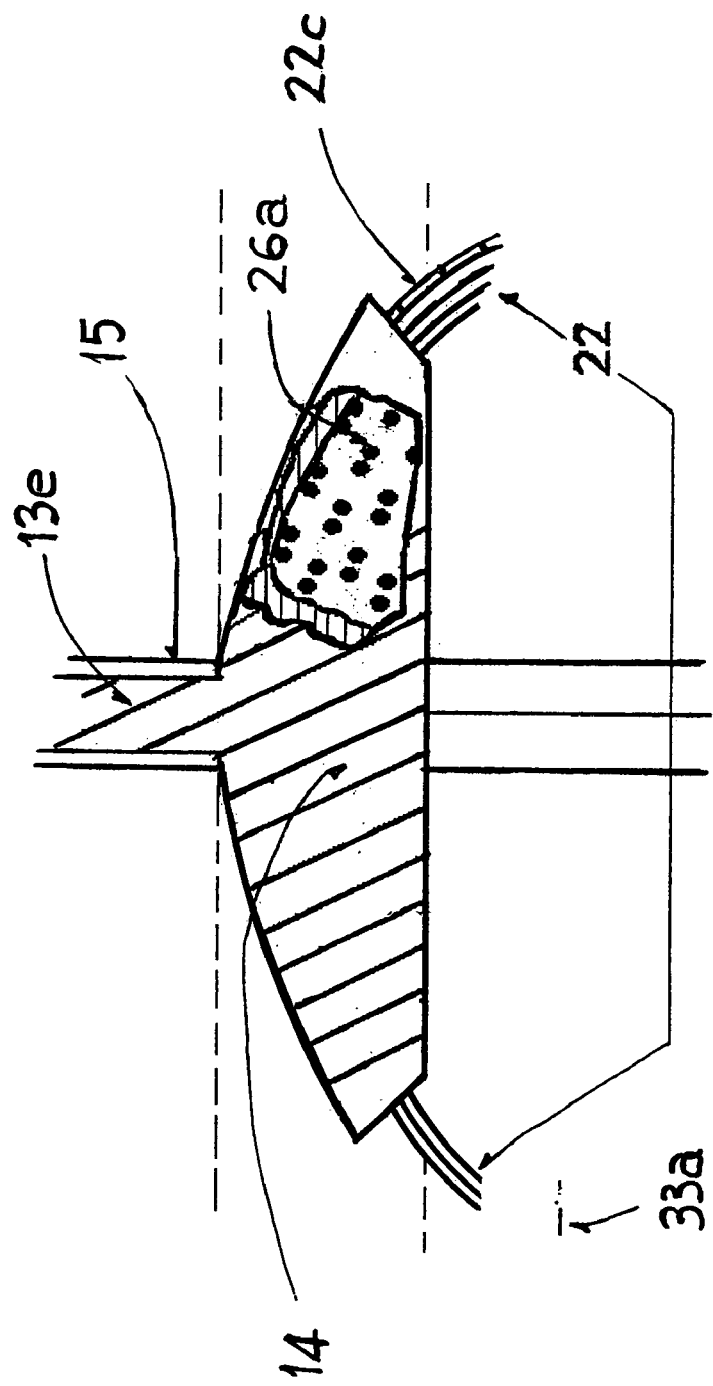
FIG. 7 is a top plan view one of the wing shaped actuator-carriage arm and integrated suspension with the cutaway view of the R/W heads.

With reference to FIG. 7, the wing shaped actuator-carriage arm 14 with the cutaway view of the R/W heads 26*a* that fly over disk surface 33*a*, where a set of multiple tracks 22 and a row of complete-uninterrupted hard disk sectors 22*c* come under the R/W heads 26*a*—as the heads 26*a* need not to be repositioned very frequently.

Figure 8:
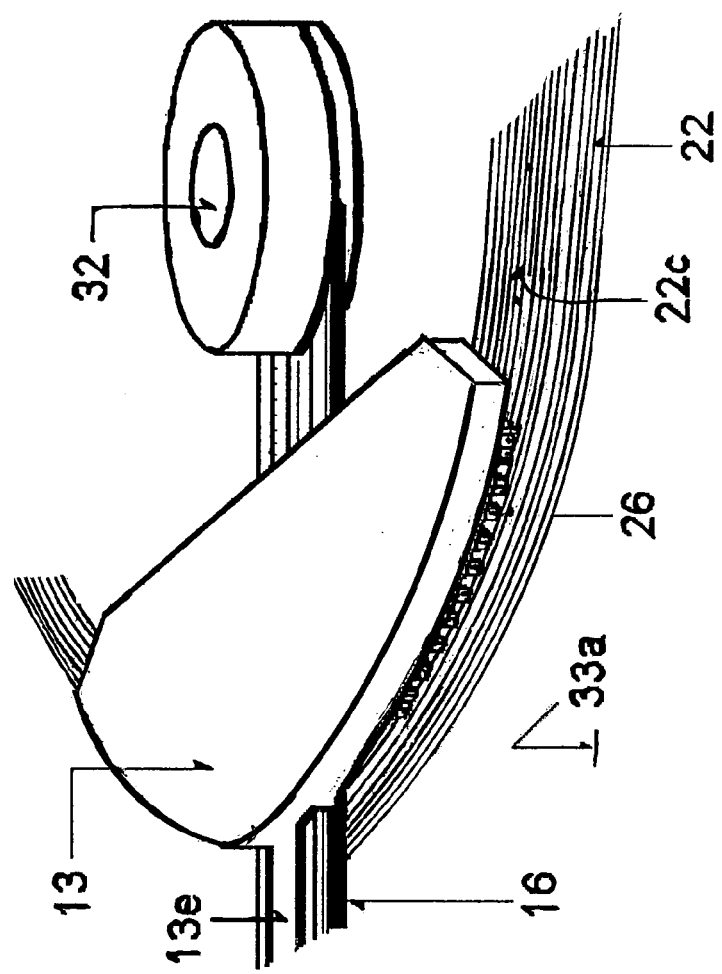
FIG. 8 is a perspective view of one of the inner side wing shaped actuator-carriage arm and integrated suspension and the R/W heads that fly over the disk surface.

With reference to FIG. 8, the inner side wing shaped actuator-carriage arm and suspension 13 can move linearly on the stationary micro-rail 16 towards and away from the center of the disk surface 33*a* and thereby the R/W heads 26 of actuator 13, that fly over the disk surface 33*a* are capable to read/write on a set of multiple adjacent tracks 22, concurrently. The disks 33 and 34 are turned by spindle motor 32.

Figure 9A:
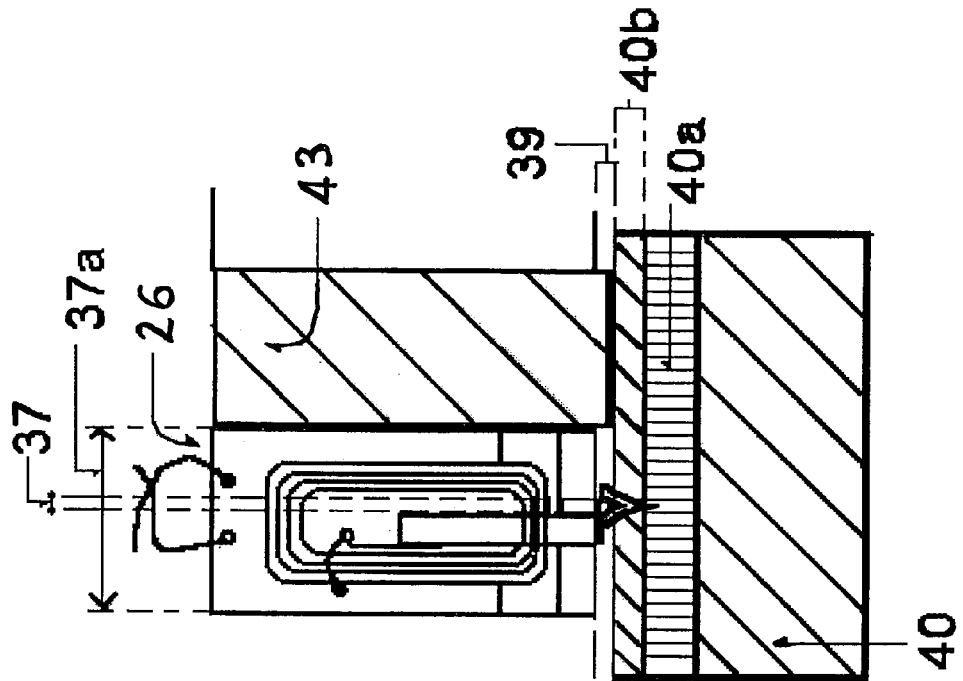
Figure 9B:
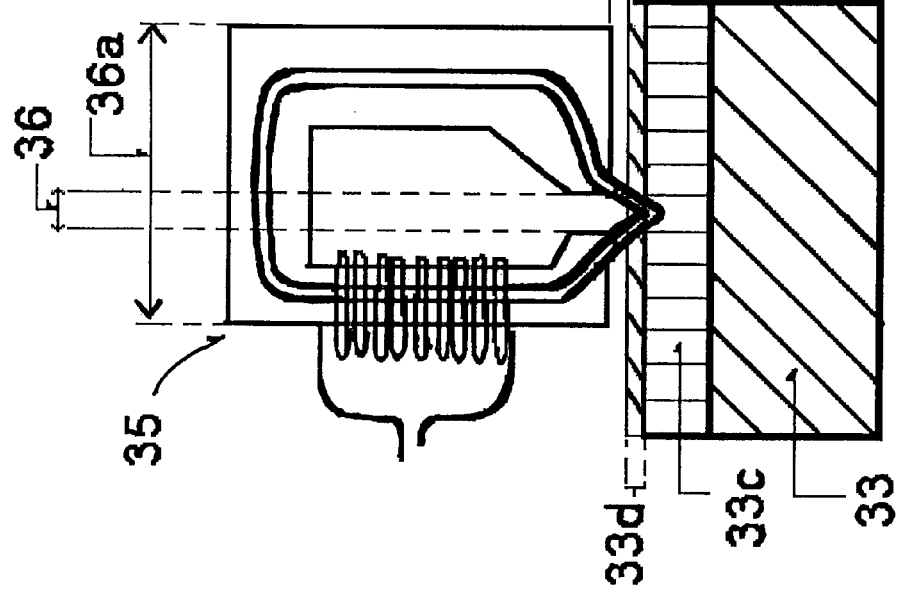
FIG. 9B is a side elevational view of the thin film head of the invention with a narrower head gap width and a reduced area of the transducer.

With reference to FIGS. 9A and 9B, in sectional view, the transducer head 35 of the prior art has a wider head width gap 36 and greater head area 36*a* as compared to the invention transducer head width gap 37 and invention transducer area 37*a*. The fly height 39 of the invention R/W head 26 is higher by only few microns—and has continuous contact pads 43—where fly height of transducer 26 parts are only few microns higher than the lowest fly height applied in the state of the art drives in this industry. In order to reduce the area of the transducers, so that overall dynamic friction is reduced, the transducer head 26 of the of invention is 40*b*. The magnetizable layer of the invention disk 40 is 40*a*.

Figure 10:
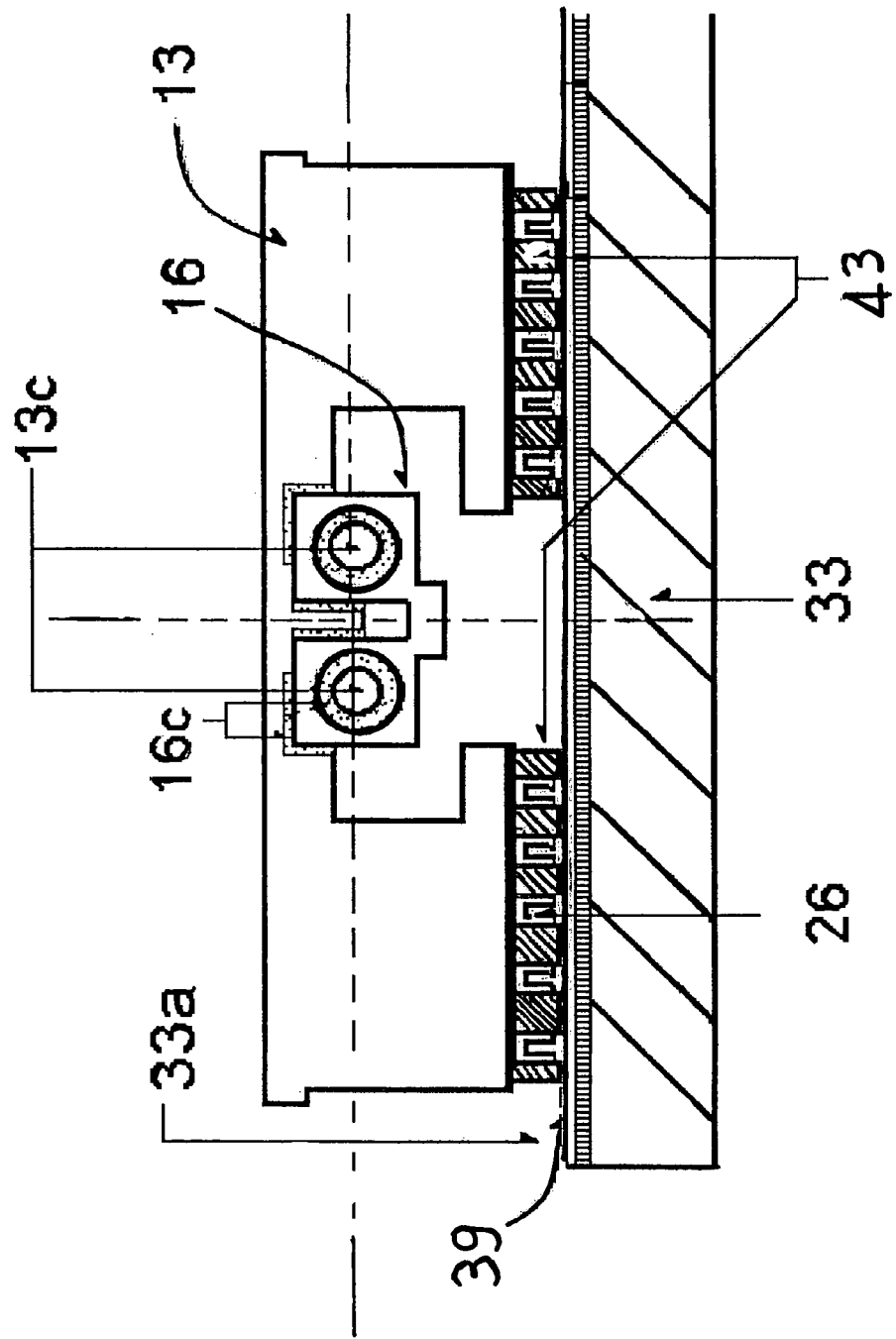
FIG. 10 is a side elevational view of the actuator arm and the R/W heads affixed thereon, which move at constant low fly height over the disk surface.

With reference to FIG. 10, the actuator arm 13 moves upon micro-rail 16. The R/W transducer heads 26 and thin pads 43 are affixed to said actuator arm 13 and fly upon disk surface 33*a* with a constant fly height 40. The actuator 13 moves as its lower cylinder rail member part 13*c* moves within the cylindrical cavity 16*h* (not shown in this drawing) of micro-rail 16.

Figure 11:
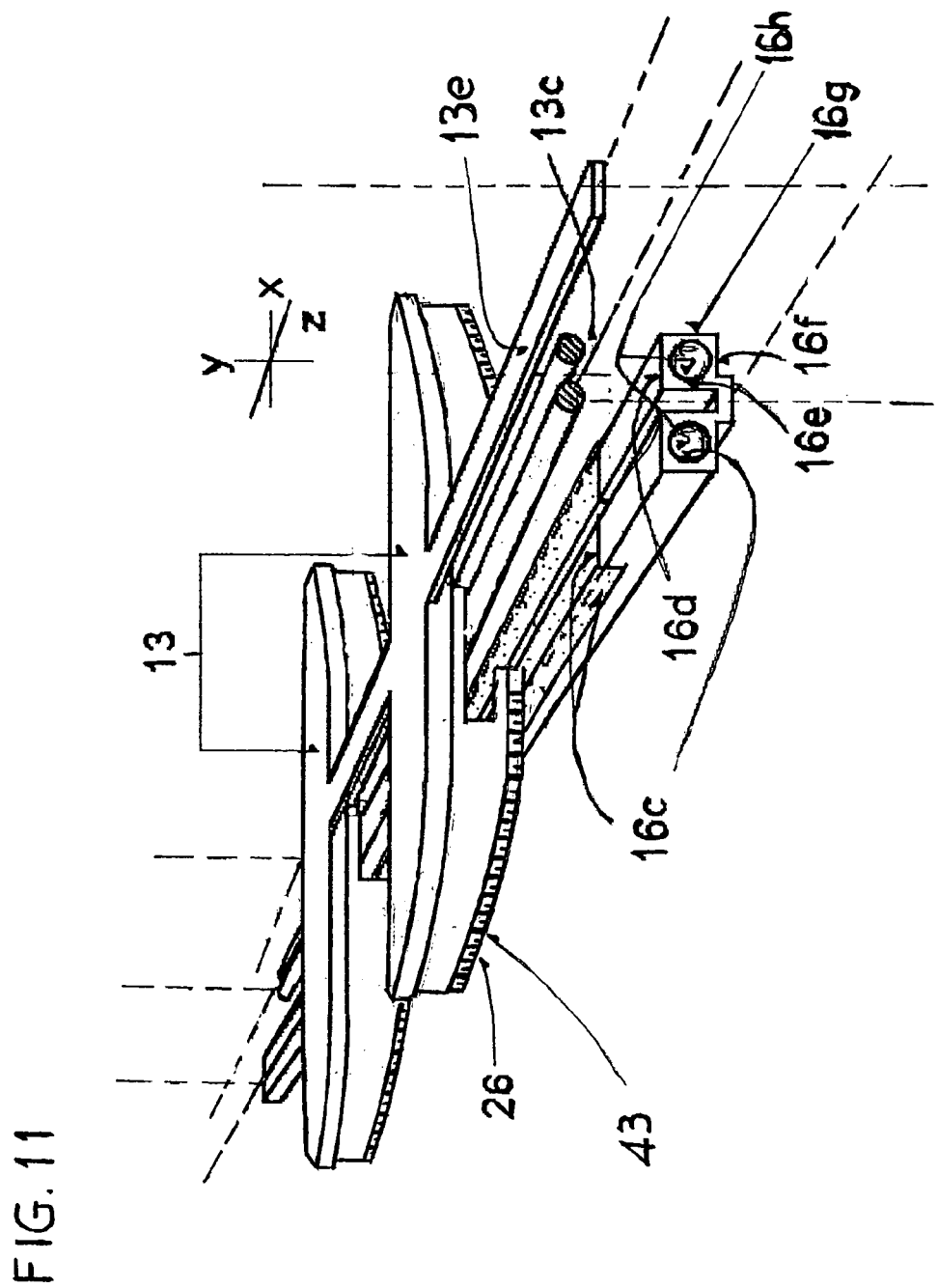
FIG. 11 is a perspective view of, one of the disassembled wing shaped pair of actuator arms above the micro-rail, with the cylindrical actuator which get into the circular cavities of the stationary rail. The stationary micro-rail, with the circular cavities is depicted just below the wing shaped actuator and its two cylindrical members.

With reference to FIG. 11, the actuator 13 and stationary micro-rail 16 are depicted as these are disassembled. The internal surfaces are such that—enclosed by the micro rail cavity 16*h*—the cylinder rail member 13*c* of the actuator 13, moves only linearly—force applied by the analog voice coil motor does not make the rail member 13*c* to make any upward-vertical, downward or horizontal deflections, since the rail member 13*c* of actuator 13 is a micro-cylinder and fits exactly to said cavity—as depicted by four sides 16*d*, 16*e* and 16*f*, 16*g* of micro rail 16. The internal surfaces of cylindrical cavities 16*h* of said rail 16 have internal and external surface coating 16*c* that minimizes friction to near zero. Such material is called near zero frictional coating (NFC) invented at Argonne laboratories. Other friction eliminating material could be applied if such is more suitable for this extremely thin layer application that involves very small components. For the form factors of 1 inch and lower, the system would enter the realm of nano-technology, as components and coatings would be proportionally smaller and thinner. R/W transducer heads 26 and thin pads 43 are seen below pairs of actuator-carriage arm 13.

Figure 12:
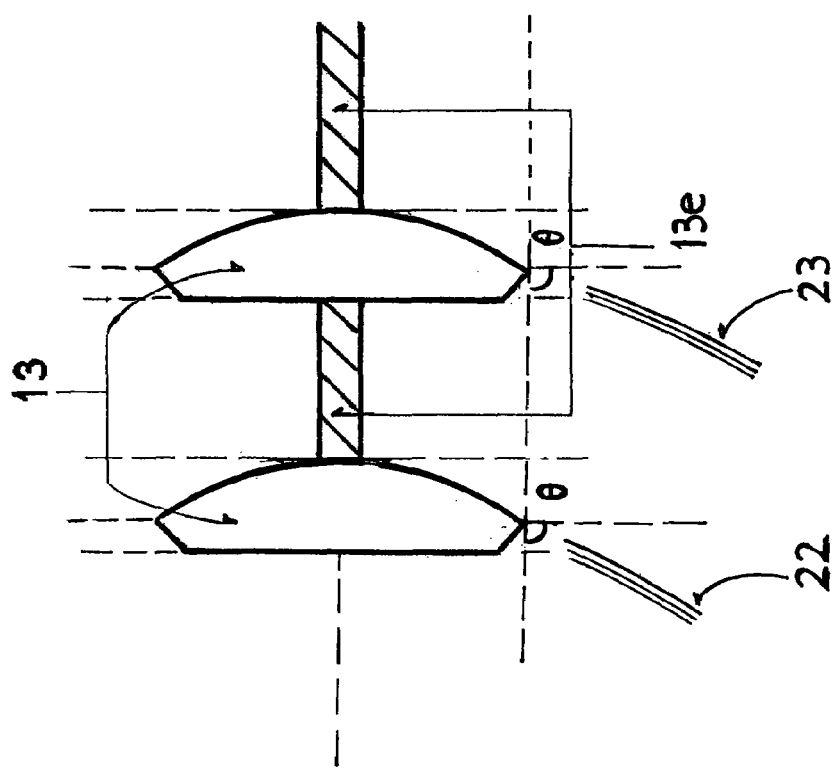
FIG. 12 is a top plan view of a pair of wing shaped actuators and the angle of data tracks, as well as the member that moves the pair of actuators.

With reference to FIG. 12, depicts in plan view, how the wing shaped pair of actuator arms 13 are able to be positioned over—at a stationary mode and receive a set of data tracks 22 and 23 at an acute angle theta—relative to the actuator arm 13. The connection and moving member 13*e*, moves the said pair of actuator arms 13 in parallel. Same applies for actuator pair 14.

Figure 13:
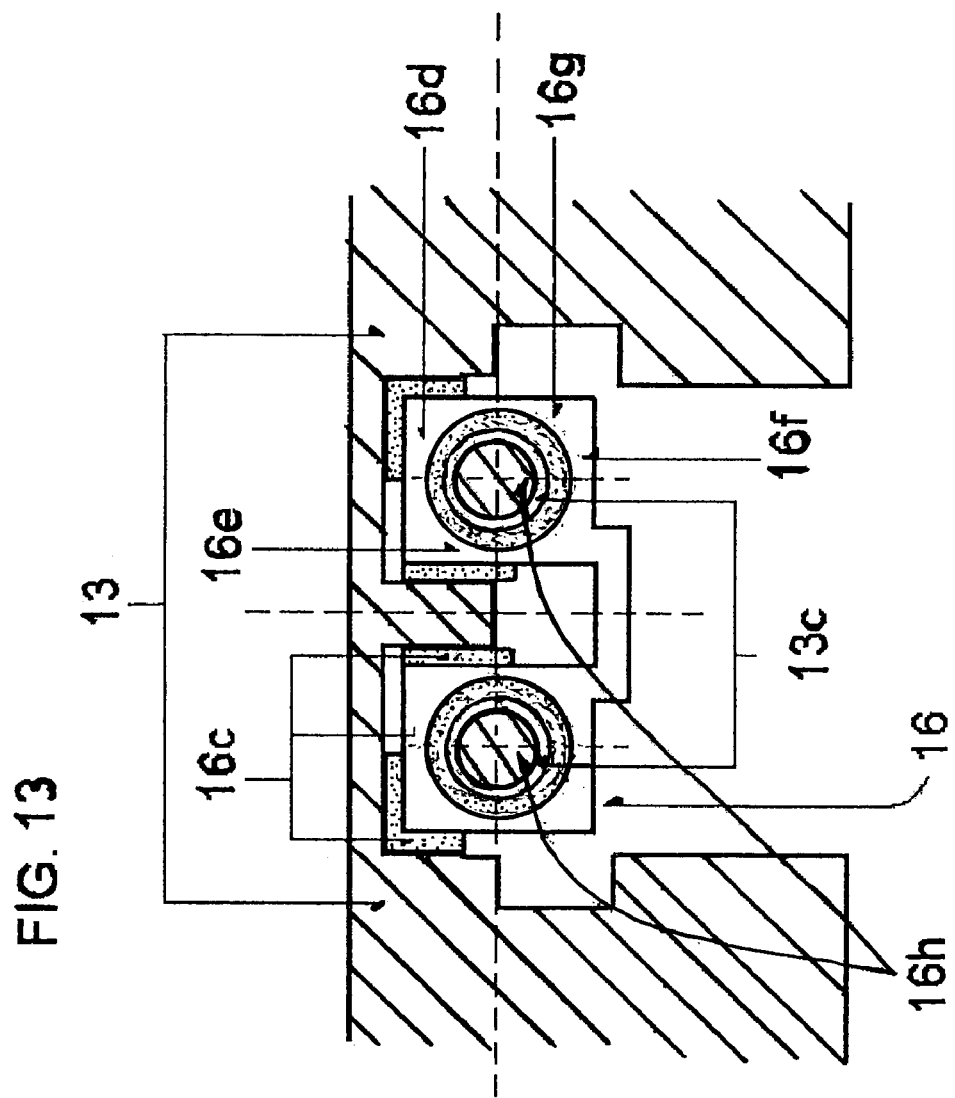
FIG. 13 is a sectional side elevational view of a pair of actuator-carriage arms and how the two cylindrical rail members move within the micro-rail cavity.

With reference to FIG. 13, sectional side view depicts the stationary micro-rail 16 that have zero friction surfaces 16*c* within the inner surface of the cylindrical cavity of the micro-rail 16 sides and on upper left and right side corners of the micro-rail 16, upon which actuator arm 13 rail-member 13c glides within. The circular cavities 13c are within the four sides 16d, 16e, 16f, 16g of the micro-rail 16.

With reference to FIG. 14, depicted are the actuator-carriage arm 13 and 14 that are at the parking mode—position when the system is in idle mode or is turned off. The inner members of the pairs of wing shaped actuator-carriage arms 13 and 14, move to a concentrically aligned non-data zone 22d—for inner actuator members—and non-data zone 22e for outer members. This enables the micro-pads 43 and R/W heads 26 and 26a (not shown in this figure—see FIGS. 2, 5 and 7) of said inner member actuators to be positioned over said ring of non-data zone 22d. For both of the outer members of the two pairs of wing shaped actuator-carriage arms 13 and 14, said actuators are moved to a second outer concentric ring non-data zone 22e.

Figure 15:
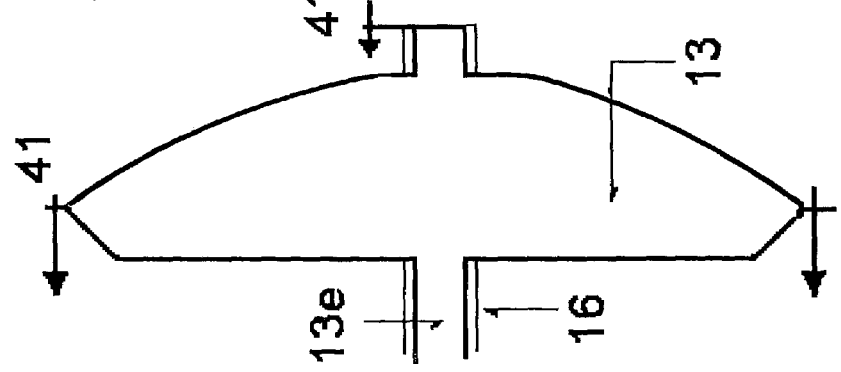
FIG. 15 is a top view of the actuator-carriage arm 13.

With reference to FIG. 15, this is the top view of actuator arm 13 and its connection member 13e that moves the pair of actuator arms in parallel.

Figure 16:
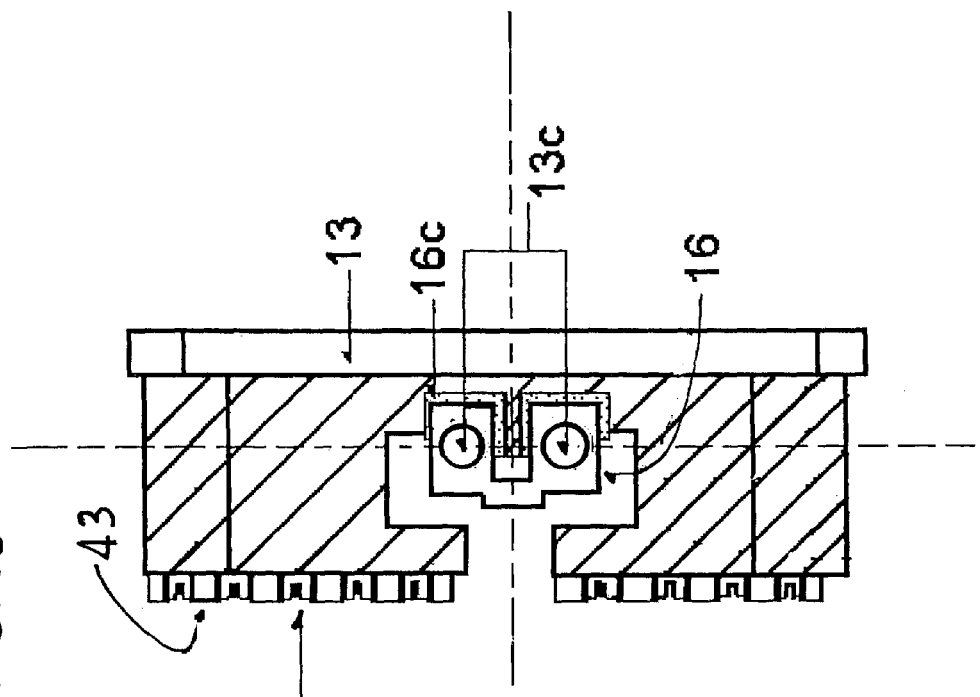
FIG. 16 is sectional view of actuator arm 13 as seen along line 41—41 in FIG. 15.

With reference to FIG. 16, this is the sectional view of actuator 13 along the line 41—41. It shows the series of arc formation R/W heads 26 and micro-pads 43 that conform to the arcs of the set of adjacent data tracks 23.

With reference to FIG. 17, this shows the partial plan view of actuator arm 13, with the cover plate of actuator completely removed-showing the multiple R/W heads 26 of the arcs of the set of adjacent data tracks 23.

With reference to FIG. 17, this shows the partial plan view of actuator arm 13, with the cover plate of actuator completely removed—showing the multiple R/W heads 26 or the are like formation, that conform to the data tracks 23. Thereby, this drawing shows the micro-actuation function of the integrated wing shaped actuator arm 13 member of the dual actuator arm assembly with respect to the adjacent tracks. When R/W heads 26 and thin pads 43 move from track origin O to track T7 the actuator 13 enables access to data tracks 23 by moving only a distance $D_o$ and R/W heads 26 are able to reach a set of points on track T7 as a function of the linear-adjacent track to track movement of the actuator and $T7_a$, shows concurrent access of the arc section and continuous sector access component of the data tracks due to the curved shape of the actuator itself, where the limit on inner tracks is indicated by tangent reference line $D_r$, that is the border of maximized reach due to the arc like geometric shape of actuator 13. The group of adjacent tracks are depicted as 23. Distance moved $D_o$ makes this distance to be multiplied and to be equal to $D'_o$. As an example to adjacent tracks 23; actuator 13 makes distance $D_o$ to be equal to the micro distance DT7, with respect to the data tracks that are adjacent and can be accessed concurrently.

With reference to FIG. 18, it is a plan view of the prior art straight arm actuator 10c that must swing over a distance $d_p$, as compared to the much shorter distance of the invention $d_o$, that actuator 13 of the invention covers for an identical distance in terms of the number of adjacent tracks—from track origin O to track T7. The $D'_o$ of FIG. 17 equals in distance to $D_p$ in FIG. 18.

Figure 19:
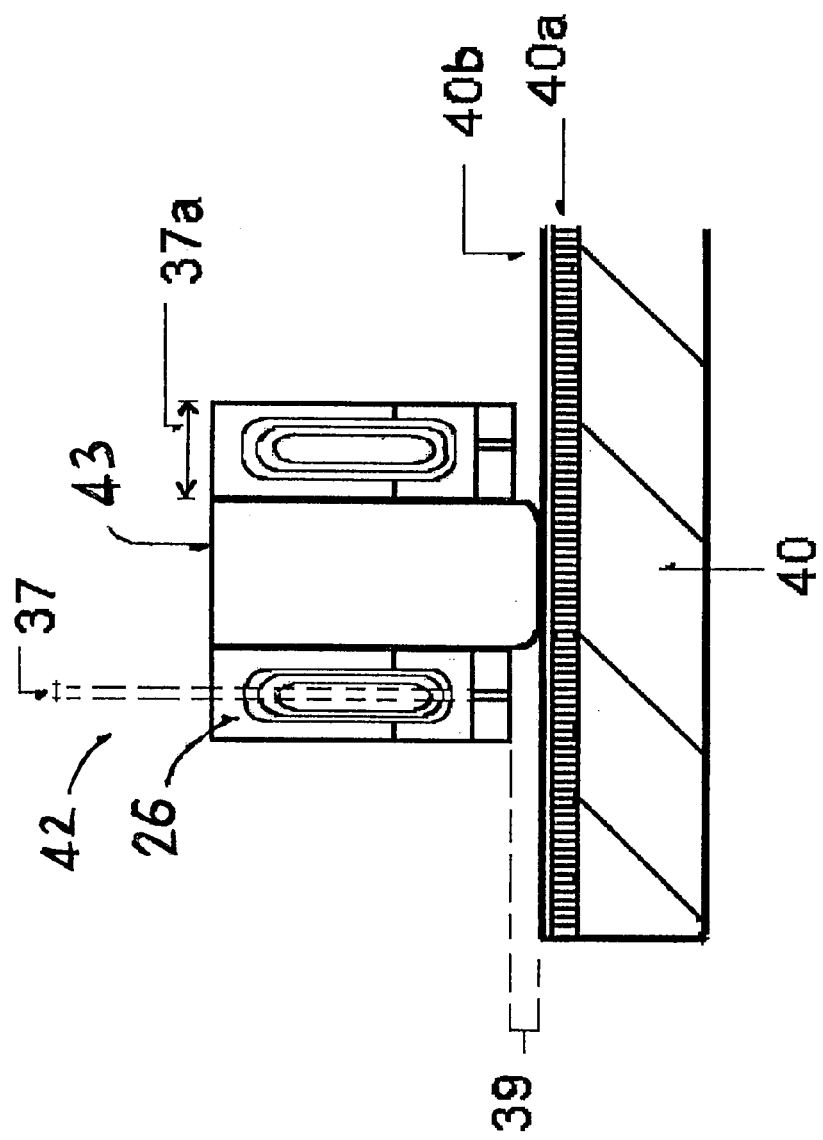
FIG. 19 is the sectional side elevation view of the micropad and the integrated thin film transducers.

With reference to FIG. 19, it is the side sectional elevation view of the continuous legitimate and valid scope of the amended claims, appropriately interpreted in accordance with the doctrine of equivalents. The invention is capable of other embodiments and of being practiced and applied in various other ways.

The device and the method mentioned heretofore have novel features that result in a new device and method for high reliability hard disk drive actuator-carriage arm and suspension system, which is not anticipated, rendered obvious, suggested, or even implied by any of the prior art hard disk drive actuator-carriage arm devices, either alone or in any combination thereof.

I claim:

1. An integrated actuator-carriage arm and suspension system for a hard disk drive information storage system-that can be an internal or an external drive, comprising of:
   a. two platters supported for rotation about an axis, and having thereon two opposite magnetic surfaces;
   b. six linear stationary micro-rails, that extend from outer perimeter edge towards the center of each said disk,
   c. two wing shaped actuator-carriage arms that move linearly over said micro rails;
   d. an actuator member supported for movement relative to said disks and said axis, two pairs of actuators for effecting controlled parallel movements of said members on two different quarters of the disk and said axis concurrently,
   e. read/write heads-where each read/write head is on the two sides of a continuous surface contact micro-pad, all supported by said actuator member for controlled precision movements in conjunction with said actuation member, movement of said member by said actuator corresponding to movement of said read/write heads adjacent and in a direction that is linear motion-tangential to data tracks, but conforming to approach angle of the arcs of said magnetic surface data tracks as a function of actuator geometry to said disk from said axis, and;
   f. evenly interspaced servo write and detection head members disposed on said member, that function as position detector to generate position signals to indicate the position of said read/write heads relative to said surface of said disk, and
   g. two flexible printed circuit (FPC) boards that have the wiring board connections which have signal lines that connect said magnetic heads and the actuators to the drive electronics board via the connection and moving members;
   h. two analog voice coil motors that move the said wing shaped two pairs of actuators along two different-independent stationary linear paths of micro-rails, and;
   i. said analog voice coil motors also have a digital mode-switching from analog to digital mode and back to analog-for skipping data tacks-when micro actuation is not needed.

2. The positioning and actuator-carriage arm system as set forth in claim 1, includes two wing shaped pairs of actuators; where each pair moves in unison-parallel to each other.

3. The actuator-carriage arm and suspension system as recited in claim 2, wherein said two pairs of actuators that move within their limited range-enable; the distance that each actuator member of these pairs have to cover to be a considerably shorter distance to reach different concentric tracks of the disk.

4. The actuator-carriage arm system as recited in claim 3, wherein said two pairs of actuators that are assigned to move only within a limited range, this said distance of back and forth motion is limited for each member to only ½ of the distance of the radius of the disk-excluding the non data zone-during operation, thereby; increases each members precision, enables several layers of programs to be loaded faster at boot up, and speeds up the external transfer rate and shortens the overall access-retrieval time of said drive.

5. The actuator-carriage arm and suspension system as recited in claim 2, wherein the two pairs of wing shaped actuators and the series of multiple R/W heads enable sufficient excess number of R/W transducer heads; that can access a multitude of data tracks with precision that are close or adjacent and therefore an additional built in micro actuator is not needed and thereby the cost of integrating micro actuator is avoided.

6. The actuator-carriage arm and suspension system as set forth in claim 1, wherein said member wing shaped actuators are arranged; to move over two different quadrants of the disk area concurrently.

7. The actuator-carriage arm and suspension system as recited in claim 5, wherein said wing shaped actuators and the R/W heads of said second pair of actuators that are affixed to said integrated suspension of said second actuators, can have access to same set of multiple tracks; with only ½ revolution of the disk, when actuators are positioned symmetrically over same set of tracks and over the opposite quadrants of the disk.

8. The actuator and carriage arm and suspension system as set forth in claim 1, wherein the movement of each other pair of wing shaped actuator; is independent of the movements of the other pair of actuator.

9. The actuator-carriage arm and suspension system as recited in claim 7, wherein the said actuators, if not positioned symmetrically, a multitude of different set of tracks are accessed byte said R/W heads of the said actuators tat are in an asymmetric position; with only less than one revolution of the disk.

10. The actuator-carriage arm system as set forth in claim 1, wherein a total of twenty four thin film R/W heads and forty eight (one micro-pad for two R/W heads,) or—multiples thereof—micro-pads are affixed to each of the wing shaped actuator-carriage arms, wherein each actuator covers multiple tracks concurrently—where concurrent R/W does not have to be made using all of R/W heads at the same time and in another mode R/W is done sequentially, even as actuators remain stationary over a set of certain tracks or make micro distance re-positioning.

11. The actuator-carriage arm and integrated suspension system as recited in claim 7 or 9, wherein the arc like shaped geometry and plurality of wing shape of the actuator and the double pair configuration of said actuator arms and a series of R/W heads form an arc like path and two wings extend over and conform to the arcs of the data tracks below, thereby; enable an uninterrupted row of complete disk sectors to pass under these said R/W head members, as said R/W beads do not need to be re-positioned frequently—as in the prior art, and therefore enable a parallel data transfer scheme.

12. The actuator-carriage arm and suspension system as set forth in claim 1, wherein both pairs of the actuators and their R/W heads are connected to the drive electronics board, by flexible printed circuit (FPC) board electronic wiring connection that connects actuators and R/W beads to the drive electronics board, via the member that moves the pair of actuator.

13. The actuator-carriage arm and integrated suspension system as recited in claim 12, wherein; the electronic communication between actuators and R/W heads can alternatively be established with a micro-range Blue tooth technology instead of flexible printed circuit wiring.

14. The actuator-carriage arm and suspension system as set forth in claim 1, wherein the two stationary micro-rails per disk surface, facilitate linear movements of said member wing shaped actuators, that enable the R/W transducer heads of said integrated suspensions of said actuators to have a continuous contact pad and a constant fly height; that enables a unique parking feature of the heads, where the R/W heads that are affixed on the wing shaped actuator and integrated two suspension sides move within the two limited ½ inner range of the radius of the disk, are moved to positions-over two concentrically aligned non data zones-which are concentric rings-one located at the outer diameter-the other closer to center of the disk, thereby;

a) system is not subject to contact start stop (CSS) operation method and, b) system is not subject to Quasi-Rigid body vibrations and relatively high vibrations due to frequent direction reversals during the boot up, scandisk, defragmentation, compression, backup and maintenance tasks-and any other tasks that involve having to reach the entire or most or data tracks that are located in different parts of the disk area.

15. The actuator-carriage arm and integrated suspension system as recited in claim 14, wherein the low fly height, is in the order of 0.1–0.5 micron above the disk surface.

16. The actuator-carriage arm and suspension system as set forth in claim 1, wherein the disk members have an optimal rpm of 7200 rpm in order to avoid heating.

17. The actuator-carriage arm system as set forth in claim 1, wherein the actuator arms and suspensions with multiple R/W heads, have embedded servo write-detection member heads to enable precise positioning on the disk.

18. The actuator-carriage arm and suspension system as set forth in claim 1, wherein the magnetic disk members that are used to write and read information upon, have a protective wear-resistant coating-that is compatible to the micro pads—that protects the magnetic layer and creates a smooth but textured surface with low capillary adhesion—and make R/W heads—independent of air lifting of disk tangential velocity.

19. The actuator-carriage arm and integrated system as recited in claim 18, wherein the independence from air lifting of disk tangential velocity is mainly a combination of functions of the continuous contact of micro-pads, and the constant height feature provided by the stationary micro-rail.

20. The actuator-carriage arm and suspension system as recited in claim 18, wherein the protective wear-resistant layer is preferably titanium di-boride or amorphous nitrided carbon, or chromium, or tungsten and the disk surface has an adhesion reducing texture.

* * * * *

UNITED STATES PATENT AND TRADEMARK OFFICE
CERTIFICATE OF CORRECTION

PATENT NO. : 7,199,981 B2
APPLICATION NO. : 10/804648
DATED : April 3, 2007
INVENTOR(S) : Fikret M. Zabtcioglu It is certified that error appears in the above-identified patent and that said Letters Patent is hereby corrected as shown below:

In Claim 10, Col. 15 Line 33 replace "forty-eight" with -- twelve --.

Signed and Sealed this

Twenty-second Day of May, 2007

JON W. DUDAS
*Director of the United States Patent and Trademark Office*